Figures 1, 2:
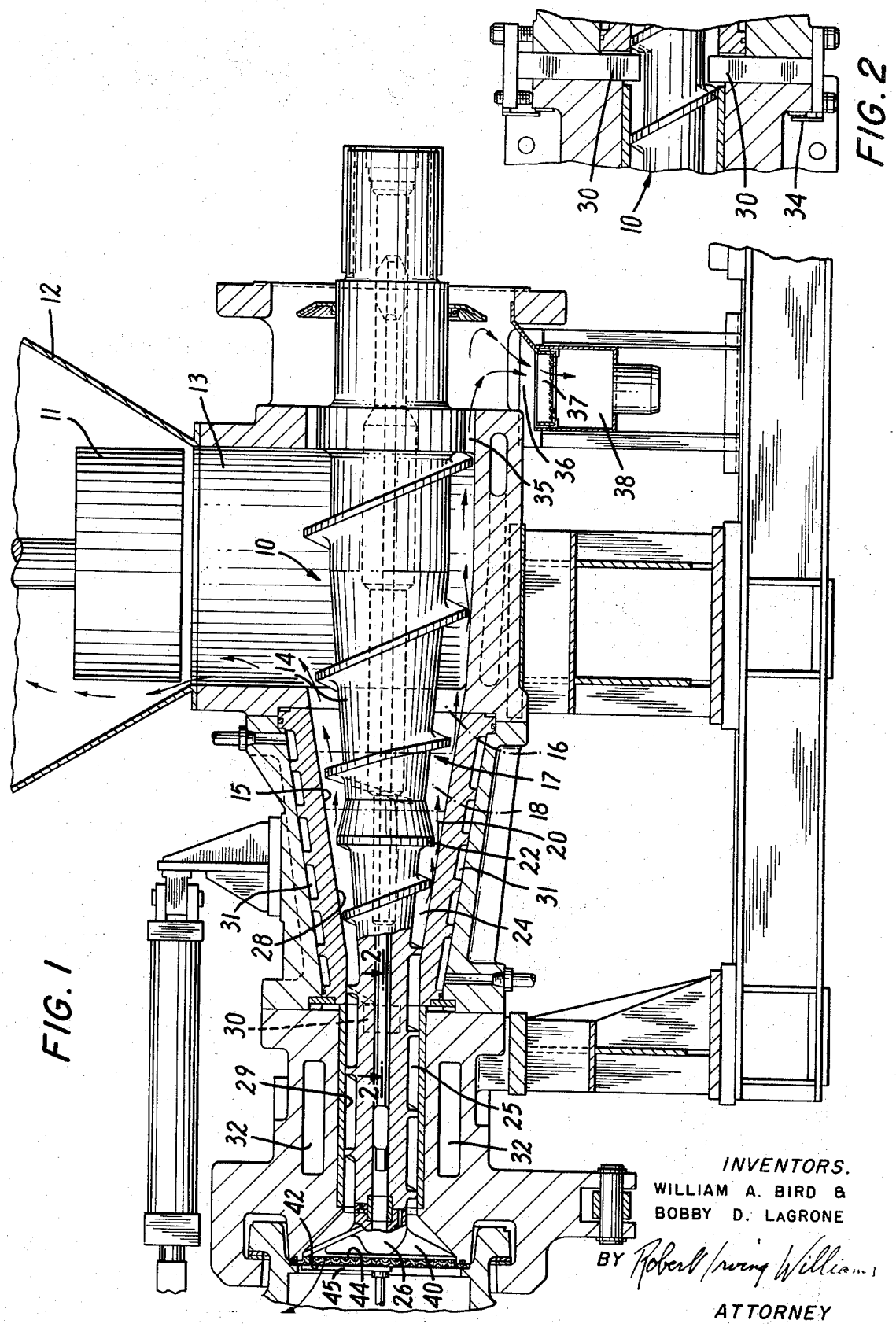

United States Patent [19]
Bird et al.

[11] 3,768,171
[45] Oct. 30, 1973

[54] DRYING WET ELASTOMERIC MATERIAL

[75] Inventors: William A. Bird; Bobby D. LaGrone, both of Vicksburg, Miss.

[73] Assignee: U.S. Rubber Reclaiming Co., Inc., Vicksburg, Miss.

[22] Filed: Aug. 16, 1971

[21] Appl. No.: 171,973

[52] U.S. Cl. .................. 34/12, 100/145, 100/93 S, 34/70, 34/14
[51] Int. Cl. .................................. F26b 7/00
[58] Field of Search ............... 425/208, 207, 209; 34/70, 14, 12; 100/145, 93 S

[56] References Cited
UNITED STATES PATENTS

| | | | |
|---|---|---|---|
| 3,067,462 | 12/1962 | Kullgren | 34/92 X |
| 2,505,125 | 4/1950 | List | 100/145 X |
| 3,548,743 | 12/1970 | Pikel | 100/145 |
| 3,225,453 | 12/1965 | Burner | 34/12 |
| 1,803,801 | 5/1931 | Henshall | 100/93 S |

Primary Examiner—William F. O'Dea
Assistant Examiner—William C. Anderson
Attorney—Robert Irving Williams

[57] ABSTRACT

Excess water is removed from wet elastomeric material such as clean-up from the floor of a synthetic rubber plant by advancing the material along a vented system of passageways of decreasing size to compress the material and progressively drive water out of it, and regurgitate it along the way, while maintaining a pressure of from 400 to 1,200 pounds per square inch and a temperature of from 200° to 350° F, and straining to provide materials adapted for normal utilization in producing rubber and like products.

4 Claims, 2 Drawing Figures

PATENTED OCT 30 1973 3,768,171

INVENTORS.
WILLIAM A. BIRD &
BOBBY D. LAGRONE

BY Robert Irving Williams
ATTORNEY

DRYING WET ELASTOMERIC MATERIAL

SUMMARY

Much otherwise useful wet elastomeric material, such as wet material cleaned up from the floor of a synthetic rubber plant and containing a high proportion of water, has been wasted or inefficiently utilized due to the lack of effective and efficient processes of preparing it for further use (i.e., removing excess water from and straining it). High amounts of moisture have been eliminated from nitrile rubber, polybutadiene, polyisoprene, SBR, butyl rubber, EPDM, EPR, and other types of synthetic rubber, either in clear, oil-extended, or black master-batch form, for example.

DETAILED DISCLOSURE

In its preferred form the process comprises simultaneously advancing and compressing continuously supplied elastomeric material while venting liquid water and/or steam therefrom, continuing the advance of the material under pressure while causing regurgitation to expel additional water, further advancing and compressing the material to exert a squeezing action to expel more water, and advancing the material under pressure toward and against an outlet having a still more restricted area while building up a pressure of about 800 pounds per square inch (pressures of from 400 to 1,200 pounds per square inch may be employed). Best results are obtained when the stock temperature toward the outlet is between 220° and 250° F., but in some instances temperatures ranging from 200° to 300° F., here or earlier, give effective results. By providing a pressure that exceeds the vapor pressure of water, the exit temperature of the stock may be kept down by the evaporation of water. There may thus be provided products which are dry but which have not been subjected to overheating due to the cooling effect of vaporization of moisture and are in condition to be used or to be worked alone or with other materials to produce useful products. In its more specific aspects the invention contemplates straining and pelletizing the material at the outlet.

The process is advantageously carried out in an apparatus comprising an advancing and compressing screw 10 arranged to receive plant clean-up from a synthetic rubber plant, or to receive other wet elastomeric material. The wet material may be fed by a ram 11 from a hopper 12 thorugh an inlet 13 and be conducted by the threads of the screw between a decreasing-diameter stem portion 14 and a decreasing-diameter casing 15 along a part 16 of a passageway portion 17 of decreasing diameter. The part 16 has a mean cross-sectional area of 117.5 square inches, and a similarly decreasing part 18 of passageway portion 17 terminates in a cross sectional area of 102.6 square inches. The screw then moves the material along a rapidly decreasing-diameter portion 20 terminating in a barrier 22 leaving 18.0 square inches open area above its periphery which provides a regurgitating action, then along a passageway portion 24 having a cross-sectional area decreasing from 52.6 to 36.7 square inches, then along a constant-diameter passageway 25 having a cross-sectional area of 18.85 leading to an outlet region 26. In the exemplified form, the decreasing-diameter casing portion 15 from the inlet 12 to the passageway portion 25 has a diameter decreasing from 15 inches to 7 inches, and the pitch of the screw threads in the passageway 25 is greater than that of the threads in the preceding passageway portions. It will also be noted that the threads are tight against the walls 28 and 29 of the passageways 24 and 25 but are spaced from the wall 15 in the passageway portion 17. Plows 30 are inserted to increase the turbulence.

Channels 31 and 32 for circulating a heating liquid or other temperature-regulating fluid are provided. Temperature levels which are above (or, if necessary, below) the temperature generated by the working of the material within the casing may be thus supplied. Temperature may be determined as by thermometers 34. The temperature may vary from 150° to 350° F. in certain instances, but particularly effective results are secured when they vary only from about 295° to 325° F.

Water may escape — for example — as a liquid through venting means 35 and 36 through a strainer 37 to a water trough 38, and/or as steam as indicated by the arrows, through the strainer through venting means in the inlet, and/or through the outlet.

The cross-sectional area may be suitably varied. The mean area of the part 16 may vary from ninety-four to 165 square inches. The area of the termination of the part 18 may vary from 82 to 144 square inches. The area of the barrier may vary from 14 to 25 square inches, that along the passageway portion 24 may decrease from a cross-sectional area of from 42 to 74 square inches to a cross-sectional area of from 29 to 52 square inches, and that along the passageway 25 may vary from 14 to 24 square inches.

In the exemplified arrangement, the outlet region 26 comprises a flaring passageway 40 leading to a pair of superposed screen plates 42 and 44 preferably having an area of about 175 square inches (plates having areas of from 78 square inches to 254 square inches have been effectively used) and a hole diameter of forty mesh (4 to 40 mesh having been effectively used). A rotatable radially mounted pelletizing knife 45 is desirably employed to pelletize the product. A throughput of 1,500 to 1,700 pounds per hour has been obtained, with reductions of moisture content from 26 percent to 1 percent and from 8 percent to 1 percent, for example.

We claim:

1. A process of drying wet elastomeric material which comprises simultaneously advancing through a restricted area and compressing continuously-supplied wet elastomeric material while venting water therefrom, regurgitating the material by moving it against a barrier during its further advance to release and expel additional water, further compressing the material during its further advance to exert an increased squeezing action which expels still more water, and then advancing the material against an outlet having a still more restricted area while building up in the wet material a pressure of from 400 to 1,200 lbs. per square inch and a temperature from about 15° to 350° F. to eliminate additional water, said advancing actions being substantially unidirectional.

2. A process as in claim 1 wherein said venting is principally of liquid water.

3. A process as in claim 1 wherein said venting is principally of vaporized water through the continuously-supplied material.

4. A process as in claim 1 wherein the material is strained through a multiplicity of small openings at the outlet where the pressure at said temperatures exceeds the vapor pressure of the water, and there is a venting of steam at the outlet.

* * * * *

PO-1050
(5/69)

UNITED STATES PATENT OFFICE
CERTIFICATE OF CORRECTION

Patent No. 3,768,171                    Dated October 30, 1973

Inventor(s) BIRD ET AL.

It is certified that error appears in the above-identified patent and that said Letters Patent are hereby corrected as shown below:

Column 1 line 48 "thorugh" should read --through--.

Column 2 line 29, "24" should read --25--.

Column 2 line 55, "15°" should read --150°--.

Signed and sealed this 4th day of June 1974.

(SEAL)
Attest:

EDWARD M. FLETCHER, JR.
Attesting Officer

C. MARSHALL DANN
Commissioner of Patents